US012015701B2

(12) United States Patent
Chen

(10) Patent No.: US 12,015,701 B2
(45) Date of Patent: Jun. 18, 2024

(54) SYSTEM AND METHOD FOR GENERATING HASH VALUES THROUGH TRUE-RANDOMNESS QUANTUM HASH FUNCTIONS

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 307 days.

(21) Appl. No.: 17/546,070

(22) Filed: Dec. 9, 2021

(65) Prior Publication Data
US 2023/0188333 A1 Jun. 15, 2023

(51) Int. Cl.
*H04L 9/08* (2006.01)
*G06N 10/60* (2022.01)
*H04L 9/06* (2006.01)

(52) U.S. Cl.
CPC .......... *H04L 9/0852* (2013.01); *G06N 10/60* (2022.01); *H04L 9/0643* (2013.01)

(58) Field of Classification Search
CPC ... H04L 9/0662; H04L 9/0852; H04L 9/0643; G06N 10/00; G06N 10/60
See application file for complete search history.

(56) References Cited

U.S. PATENT DOCUMENTS

| | | | |
|---|---|---|---|
| 11,310,060 B1* | 4/2022 | Poelstra | H04L 9/3066 |
| 2015/0199175 A1* | 7/2015 | Wang | G06F 7/58 708/250 |
| 2016/0248583 A1* | 8/2016 | McClanahan | G06F 21/78 |
| 2023/0047518 A1* | 2/2023 | Shorten | H04L 9/0894 |

* cited by examiner

*Primary Examiner* — Shin-Hon (Eric) Chen
*Assistant Examiner* — Brian William Avery

(57) ABSTRACT

A system and method for generating quantum hash values through true-randomness hash functions to facilitate security on use of hash values, especially to a quantum hash value generator for providing a hash value with true randomness. Through operations of Borel-measure derivation, Lebesgue-dominated validation, and quantum-hash-value derivation, such technology not only provides hash functions with true randomness, but also enhances to implement a mechanism to generate various quantum hash functions instantly.

4 Claims, 5 Drawing Sheets

SYSTEM AND METHOD FOR GENERATING HASH VALUES THROUGH TRUE-RANDOMNESS QUANTUM HASH FUNCTIONS

BACKGROUND OF THE INVENTION

1. Field of the Invention

The present invention relates to a system and method to enhance security on use of hash values, and in particular, to a quantum hash value generator for providing a hash value derived from hash functions implemented with true randomness.

2. Description of the Related Art

Until now, most conventional quantum cyber security technologies mainly focus on the development of quantum key distribution (QKD) technology or post-quantum cryptography (PQC) technology. There is seldom a corresponding solution to enhance hash functions with true randomness to generate hash values for cyber security usages such as key authentication, one-time password, file storage, and so on. Therefore, it is desirable to develop approaches or a system to provide solutions for generating hash values through true-randomness hash functions.

BRIEF SUMMARY OF THE INVENTION

In view of improving the conventional technologies, it is an object of the present invention to provide a system and method for generating hash values through true-randomness hash functions. Once a system can provide a hash value with true-randomness solution, the cyber security of file transmission will be enhanced further.

Furthermore, the present invention can generate a plurality of random quantum hash functions, thereby implementing a multiple-layers hashing mechanism to overcome rainbow-table cracking. Such technology can be applied to a system with workstations, network attached storages (NAS), and webservers; and is applicable for authentication processes to protect most of file transmission cases as well.

To achieve the above objects and more, the present invention provides a solution for generating quantum hash functions to enhance security on use of hash values. Wherein the solution (or a system) is implemented with the following approaches and dataflow: a) first, coupling a quantum random number generator to collect a plurality of sample points within a configured open-set interval of a Euclidean n-space; b) thereafter, generating available Borel sets based on a metric space composed of the collected sample points via means of union operation of countable sets (such as $A \cup B = \{x: x \in A \text{ is countable or } x \in B \text{ is countable}\}$), intersection operation of countable sets (such as $A \cap B = \{x: x \in A \text{ is countable and } x \in B \text{ is countable}\}$), and complement operation of a set (such as $B \setminus A = \{x \in B: x \notin A\}$); c) moreover, deriving a Borel σ-algebra based on the available Borel sets via means of transfinite induction and iteration computing; for example, for a sequence $G^m$ where m is an ordinal number, let $G^0$ be the collection of open subsets of X, and then let $G^i = [G^{i-1}]_{\delta\sigma}$ when i is not a limit ordinal, and let $G^i = \bigcup_{j<i} G^j$ when i is a limit ordinal, thereby the Borel σ-algebra $G^{\omega_1}$ can be generated from the class of open sets by iterating the operation where $\omega_1$ is the first uncountable ordinal number; d) according to the derived Borel σ-algebra, deriving a corresponding Borel measure in a configured close-set interval; e) thereafter, making use of the derived Borel measure collaborating an operation of normalization to come out a probability density function (PDF) where the sum of the probability is 1 in a configured close-set interval; f) thereafter, leveraging Lebesgue's dominated convergence theorem to perform a validation on the PDF; g) thereafter, once the result of the validation showing that the validated PDF fits Lebesgue's dominated convergence, determining that the validated PDF is an applicable quantum hash function; h) repeatedly performing processes a)~g) in sequence and discarding duplicated quantum hash functions, so as to get a plurality of applicable quantum hash functions; i) getting a user input value from a webserver wherein the input value is mapping to the configured open-set interval of a Euclidean n-space, and then performing an operation of isomorphism mapping to switch the user input value into a form of Lebesgue measure in the configured close-set interval; and j) selecting one or more applicable quantum hash functions for deriving candidate hash tables and leveraging the Lebesgue measure of the user input value as an index parameter of a quantum hash table selected from the candidate hash tables; wherein, if there are more than one applicable quantum hash functions selected for deriving a candidate hash table, makes the value generated from the former quantum hash function be the input parameter of the later quantum hash function in sequence; so as to generate a corresponding quantum hash value.

It is to be noted that the following mentioned sub-systems and modules are equivalent to a set of software libraries or instructions within a plurality of compiled functions stored in a database, which is executed by a x86-architectured CPU and can be re-accessed for performing a series of processes step by step meanwhile which can be uploaded or downloaded via a communication interface.

In order to implement the above-mentioned approaches and dataflow, the present invention provides an embodiment for generating quantum hash functions to enhance security on use of hash values. This embodiment implements a system including: a first sub-system for deriving a Borel measure; a second sub-system, coupled to the first sub-system, for determining an applicable quantum hash function based on the Borel measure derived from the first sub-system through an operation of Lebesgue's dominated convergence validation; and a third sub-system for making user's input data be mapped to a quantum hash value through candidate hash tables derived from the applicable quantum hash functions generated by the second sub-system.

In an embodiment, in order to derive a Borel measure, the first sub-system includes the following modules: a sample-points collection module, a Borel-set generator module, and a Borel-measure derivation module. Wherein, the sample-points collection module is coupled to a quantum random number generator for collecting a plurality of sample points within an open-set interval of a Euclidean n-space ($E^n$, the n-dimensional Euclidean space). Thereafter, the Borel-set generator module generates available Borel sets based on a metric space composed of the collected sample points; for example, let X be a power set of the collected sample point $(x_1, x_2, \ldots, x_n)$ and d is Euclidean distance derived from the collected sample points such as $$\|x\|_2 := \sqrt{x_1^2 + \ldots + x_n^2}$$

so that the metric space is (X,d), where B(X) contains all open subsets of X, thereby the elements of B are the available Borel sets of X. Thereafter, the Borel-measure derivation module derives corresponding Borel measure based on a Borel σ-algebra derived from the available Borel sets. Once there is a derived Borel measure output from the Borel-measure derivation module, the first sub-system will deliver it to the second sub-system attempting to derive a quantum hash function.

In an embodiment, in order to deal with the derived Borel measure delivered from the first sub-system so as to facilitate deriving an applicable quantum hash function, the second sub-system comprises a PDF derivation module and a Lebesgue's dominated convergence validator module. Wherein, the PDF derivation module derives a probability density function (PDF) conducted from the derived Borel measure in a configured close-set interval through an operation of normalization; for example, let's get a probability measure from the derived Borel measure first, thus we can set the probability measure as μ: B(X)→[0, ∞) such that μ(Ø)=0, and $B_1, B_2, \ldots \in B$ mutually disjoint, hence $$\mu\left(\bigcup_{i=1}^{\infty} B_i\right) = \sum_{i=1}^{\infty} \mu(B_i),$$

and once we set μ(X)=1, this module will get a Borel probability measure for probability measurements in a configured close-set interval; thereby the PDF derivation module will be able to derive a PDF via making use of the Borel probability measure μ and collaborating with an operation of normalization. Thereafter, the Lebesgue's dominated convergence validator module determines whether the derived probability density function is an applicable quantum hash function through an operation of validation with Lebesgue's dominated convergence theorem. Furthermore, the system can coordinate the first sub-system and the second sub-system in sequence repeatedly and discards duplicated quantum hash functions derived by the second sub-system; that facilitates the third sub-system to generate various candidate hash tables through a plurality of applicable quantum hash functions, wherein those hash tables will be stored in a database located on a network attached storage (NAS).

In an embodiment, in order to facilitate making a user input value be switched into a form of Lebesgue measure to generate a quantum hash value through the determined applicable quantum hash functions, the third sub-system comprises a quantum hash table storage module, a Lebesgue-measure switching module, and a quantum-hash-value generator module. Wherein, the quantum-hash-table storage module stores candidate quantum hash tables in a database located on a storage device (ex: a NAS, network attached storage) wherein the candidate quantum hash tables are derived from the applicable quantum hash functions determined by the second sub-system. Thereafter, the Lebesgue-measure switching module receives a user input value and switches the user input value into a form of Lebesgue measure through an operation of isomorphism mapping; for example, this module receives user's data from a webserver and then treats the user's data as a set of points so as to get corresponding Euclidean norms from the set of points; via use of the Euclidean norms, the Lebesgue-measure switching module can switch the set of points into a Euclidean space to be the user input value, and then get the Lebesgue measure of the input value through an operation of isomorphism mapping from the Euclidean space. Further, the quantum-hash-value generator module selects one or more candidate quantum hash tables stored by the quantum-hash-table storage module; and makes the Lebesgue measure which is derived from the Lebesgue-measure switching module as an index parameter of the selected hash table(s) so as to generate a corresponding quantum hash value(s).

DETAILED DESCRIPTION OF THE INVENTION

To facilitate understanding of the objects of this present disclosure, embodiments including method, operations, workflow, outcomes, and relationships between sub-systems together with the attached drawings for the detailed descriptions of the present disclosure are provided.

A plurality of embodiments in regard to a system for generating quantum hash functions is provided as follows. In some embodiments this technology can be coupled to workstations, network attached storages (NAS), and webservers to implement mechanisms for generating various hashing algorithms dynamically.

Figure 1A:
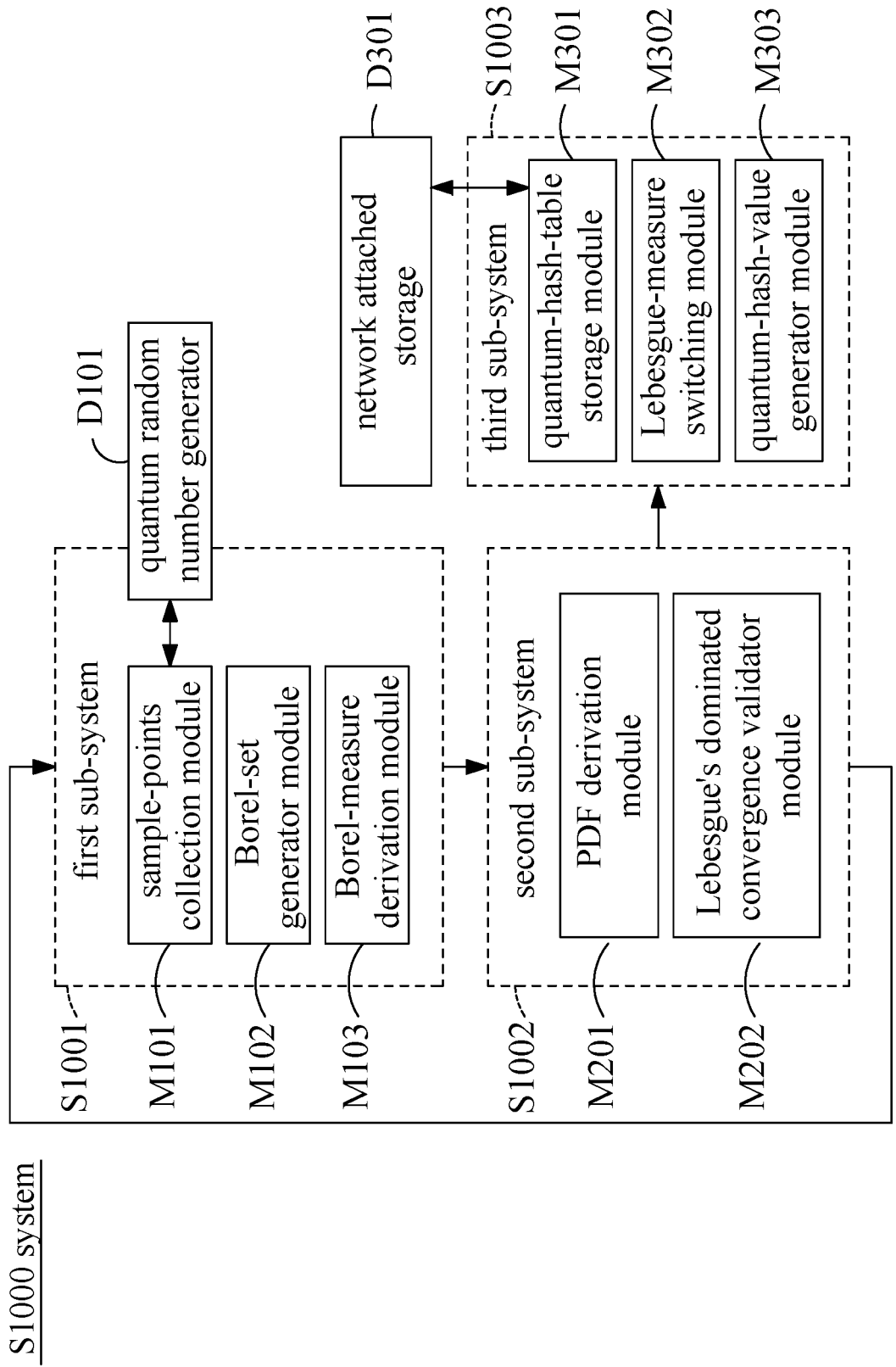
FIG. 1A is a structural block diagram of a system for generating quantum hash values through true-randomness quantum hash functions according to an embodiment of the present invention.

Refer to FIG. 1A, which is a structural block diagram of a system for generating quantum hash values to enhance security on use of hash values according to an embodiment of the present invention. In an embodiment, the system S1000 for generating quantum hash values includes a first sub-system S1001 as a Borel-measure-derivation sub-system, a second sub-system S1002 as a Lebesgue-dominated-validation sub-system, and a third sub-system S1003 as a quantum-hash-value derivation sub-system.

Figure 2A:
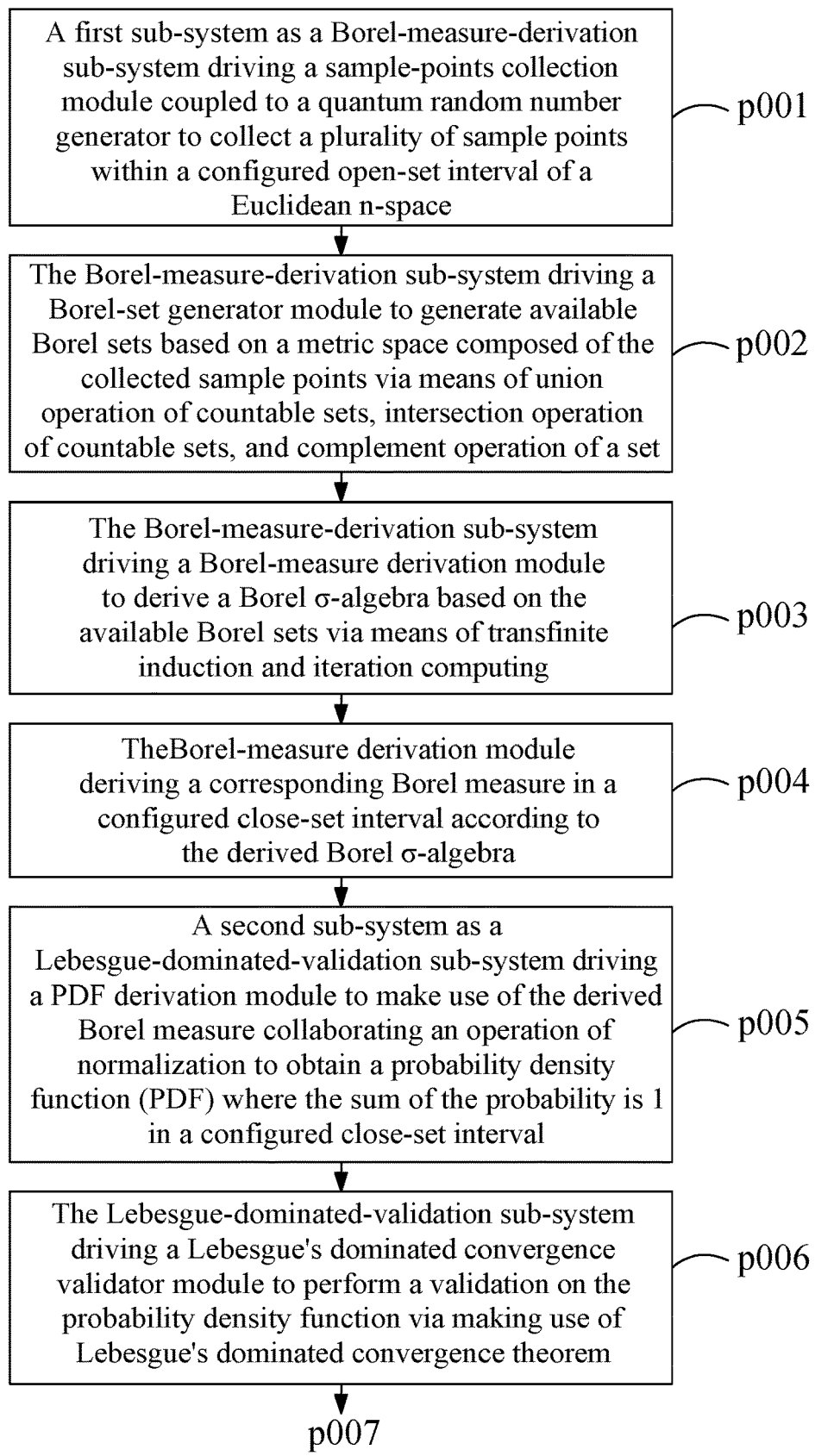
FIG. 2A is a dataflow diagram showing main data flow related to FIG. 1A.
Figure 2B:
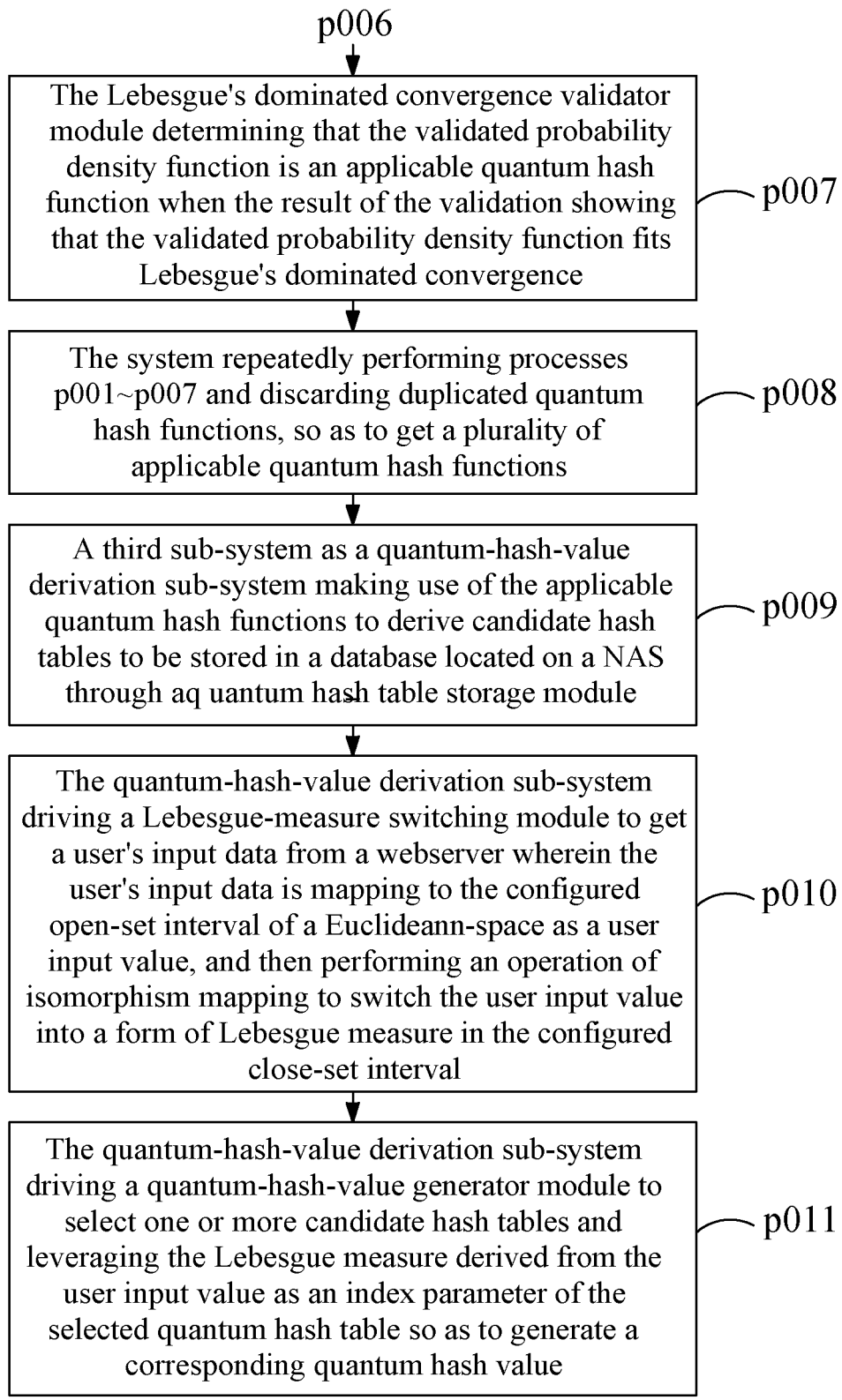
FIG. 2B is a dataflow diagram showing main data flow related to FIG. 1A.

Also referring to FIG. 2A and FIG. 2B together with FIG. 1A, a main workflow for an implementation of the present invention is shown as blocks p001~p011 for introducing the stages of the above-mentioned sub-systems in brief: a) as shown in block p001, a first sub-system S1001 as a Borel-measure-derivation sub-system driving a sample-points collection module M101 coupled to a quantum random number generator D101 to collect a plurality of sample points within a configured open-set interval of a Euclidean n-space ($E^n$, the n-dimensional Euclidean space) through a sampling operation; b) thereafter, as shown in block p002, the Borel-measure-derivation sub-system S1001 driving a Borel-set generator module M102 to generate available Borel sets based on a metric space composed of the collected sample points via means of union operation of countable sets (such as A∪B={x: x∈A is countable or x∈B is countable}), intersection operation of countable sets (such as A∩B={x: x∈A is countable and x∈B is countable}), and complement operation of a set (such as B\A={x∈B: x∉A}); c) further, as shown in block p003, the Borel-measure-derivation sub-system S1001 driving a Borel-measure derivation module M103 to derive a Borel σ-algebra based on the available Borel sets via means of transfinite induction and iteration computing; for example, for a sequence $G^m$ where m is an ordinal number, let $G^0$ be the collection of open subsets of X, and then let $G^i=[G^{i-1}]_{\delta\sigma}$ when i is not a limit ordinal, and let $G^i=U_{j<i} G_j$ when i is a limit ordinal, thereby the Borel σ-algebra $G^{\omega_1}$ can be generated from the class of open sets by iterating the operation where $\omega_1$ is the first uncountable ordinal number; d) thereafter, as shown in block p004, the Borel-measure derivation module M103 deriving a corresponding Borel measure in a configured close-set interval according to the derived Borel σ-algebra; e) the next stage, as shown in block p005, a second sub-system as a Lebesgue-dominated-validation sub-system S1002 driving a PDF derivation module M201 to make use of the derived Borel measure collaborating an operation of normalization to come out a probability density function (PDF) where the sum of the probability is 1 in a configured close-set interval; f) thereafter, as shown in block p006, the Lebesgue-dominated-validation sub-system S1002 driving a Lebesgue's dominated convergence validator module M202 to perform a validation on the probability density function via making use of Lebesgue's dominated convergence theorem; g) thereafter, as shown in block p007, the Lebesgue's dominated convergence validator module M202 determining that the validated probability density function is an applicable quantum hash function when the result of the validation showing that the validated probability density function fits Lebesgue's dominated convergence; h) as shown in block p008, the system S1000 repeatedly performing processes p001~p007 and discarding duplicated quantum hash functions, so as to get a plurality of applicable quantum hash functions; i) meanwhile, as shown in block p009, a third sub-system S1003 as a quantum-hash-value derivation sub-system making use of the applicable quantum hash functions to derive candidate hash tables to be stored in a database located on a NAS through a quantum hash table storage module M301; furthermore, in some embodiments, the quantum-hash-value derivation sub-system s1003 making the value generated from the former quantum hash function be the input parameter of the later quantum hash function in sequence so as to generate corresponding quantum hash values for a candidate hash table if there are more than one applicable quantum hash functions selected for deriving a candidate hash table; j) besides, as shown in block p010, the quantum-hash-value derivation sub-system driving a Lebesgue-measure switching module M302 to get a user's input data from a webserver wherein the user's input data is mapping to the configured open-set interval of a Euclidean n-space as a user input value, and then performing an operation of isomorphism mapping to switch the user input value into a form of Lebesgue measure in the configured close-set interval; k) at last, as shown in block p011, the quantum-hash-value derivation sub-system s1003 driving a quantum-hash-value generator module M303 to select one or more candidate hash tables and leveraging the Lebesgue measure derived from the user input value as an index parameter of the selected quantum hash table(s) so as to generate a corresponding quantum hash value(s). Thereby, the system S1000 will achieve the object of generating quantum hash values through true-randomness hash functions.

Figure 3:
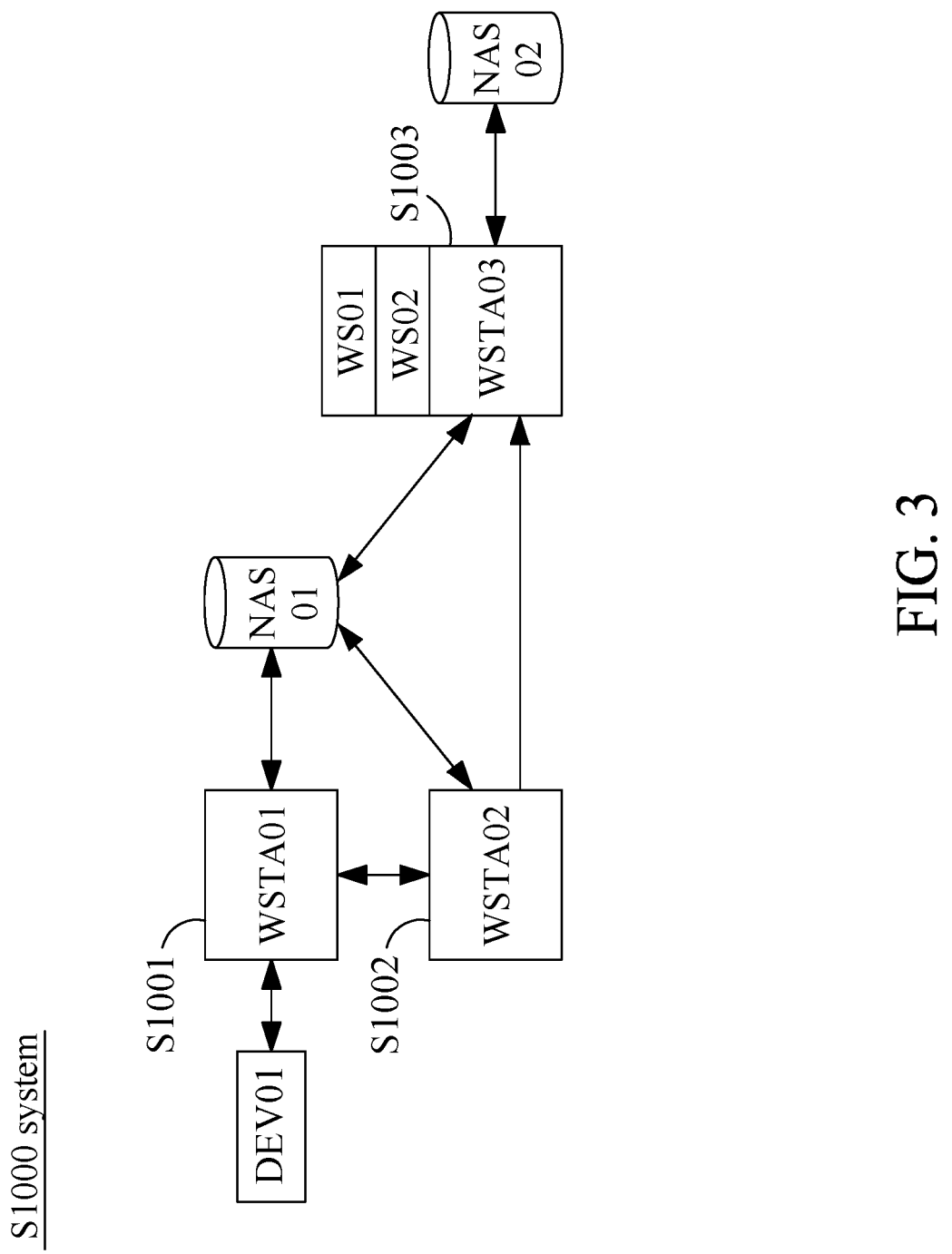
FIG. 3 is a schematic diagram of a user scenario according to an embodiment of FIG. 1A.

Referring to FIG. 3, for example, as a role of system for generating quantum hash values through true-randomness hash functions, it is usually a system S1000 established with the following items: a) workstations (such as WSTA01~WSTA03) installed with related sub-systems (such as S1001~S1003); b) network attached storages (such as NAS01 and NAS02) for storing system databases, and file databases; for instance, in an embodiment, NAS01 is a network attached storage comprising a system database for storing compiled functions applied for the related libraries or instructions of the disclosed sub-systems or modules in the present invention; meanwhile NAS02 is a network attached storage comprising a file database for storing the candidate hash tables; and c) webservers (such as WS01 and WS02) operating on the workstation(s) for various user groups with different requirements on hash-value usages; for instance, WS01 is a webserver built for verifying user's executable files while WS02 is another webserver built for user's key authentication; wherein the workstations and network attached storages are located in a VLAN. Hence, as a cyber-security implementation, the related sub-systems (S1001~S1003) and coupled device (such as DEV01, the quantum random number generator for facilitating sample-points collection) should be working together in the embodiments of the present invention. Thereafter, the inter-operation will be illustrated in the following descriptions.

In the present disclosure, a sub-system (or a module) is generally equivalent to a set of software libraries or instructions within a plurality of compiled functions stored in a database, which is executed by a x86-architectured CPU and can be re-accessed for performing a series of processes step by step meanwhile which can be uploaded or downloaded via a communication interface.

Figure 1B:
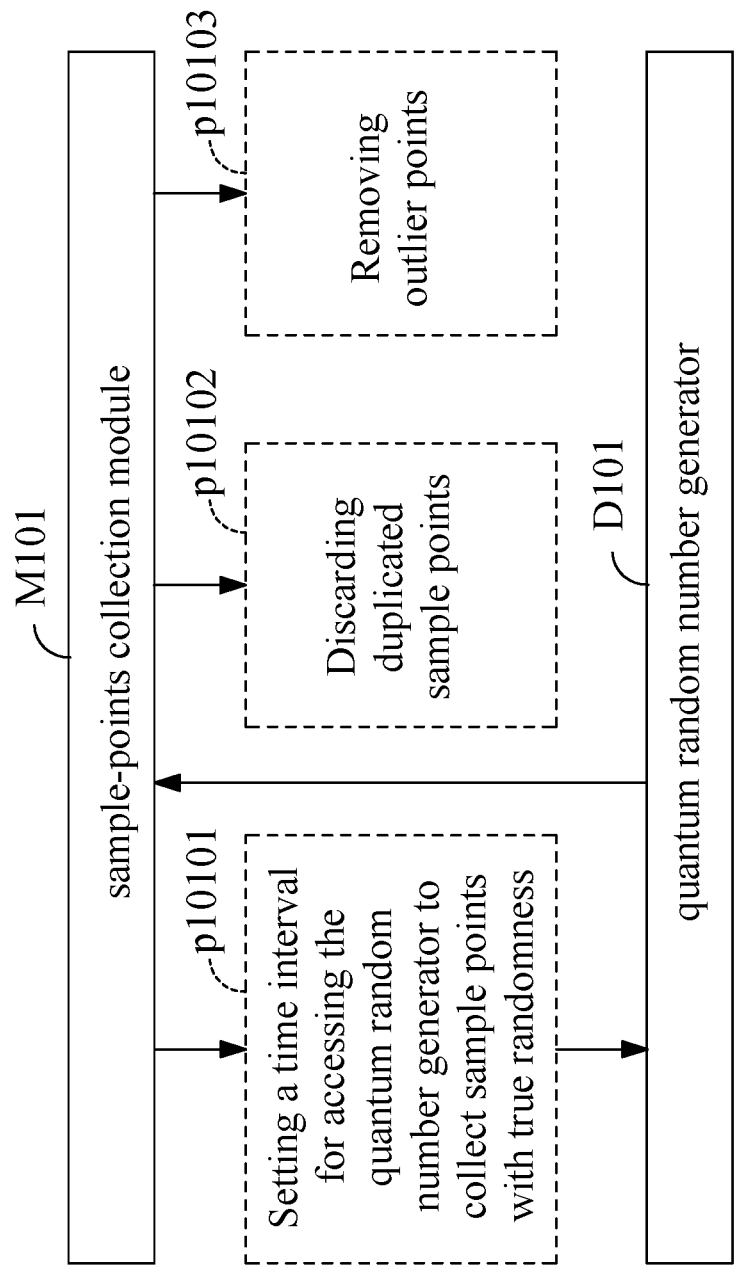
FIG. 1B is a dataflow diagram showing a sampling operation between the sample point collection module and the quantum random number generator according to an embodiment related to FIG. 1A.

Still referring to FIG. 3 and also referring to FIG. 1A, in an embodiment, the first sub-system S1001 installed in WSTA01 collaborating with a quantum random number generator DEV01 (D101 in FIG. 1A) performs operations of Borel-measure derivation, wherein the operations of Borel-measure derivation are implemented by the following modules stored in a system database located on NAS01: 1) a sample-points collection module M101 coupled to the quantum random number generator DEV01 which collects a plurality of sample points within an open-set interval of a n-dimensional Euclidean space $E^n$; wherein, besides mapping the sample space to an open-set interval of $E^n$, also referring to FIG. 1B, a sampling operation between the sample-points collection module M101 and the quantum random number generator DEV01 includes the following means: a) as shown in block p10101, the sample-points collection module configuring a time interval for accessing the quantum random number generator DEV01 to collect sample points with true randomness; b) as shown in block p10102, the sample-points collection module discarding duplicated sample points; and c) as shown in block p10103, the sample-points collection module removing outlier points before outputting the collection result; 2) a Borel-set generator module M102 which generates available Borel sets based on a metric space composed of the collected sample points via means of union operation of countable sets (such as $A \cup B = \{x: x \in A$ is countable or $x \in B$ is countable$\}$), intersection operation of countable sets (such as $A \cap B = \{x: x \in A$ is countable and $x \in B$ is countable$\}$), and complement operation of a set (such as $B \backslash A = \{x \in B: x \notin A\}$); for example, in an embodiment, a set of processes performed by the Borel-set generator module M102 for generating available Borel sets comprises: a) let X be a power set of the collected sample point $(x_1, x_2, \ldots, x_n)$; b) let d is Euclidean distance derived from the collected sample points such as $$\|x\|_2 := \sqrt{x_1^2 + \ldots + x_n^2}$$

so that the metric space is (X,d); c) set B(X) containing all open subsets of X; and d) deriving elements of B through operations of union, intersection, and complement on countable sets that the derived elements are the available Borel sets of X; and 3) a Borel-measure derivation module M103 which derives a Borel σ-algebra based on the available Borel sets via means of transfinite induction and iteration computing; wherein, the means of transfinite induction and iteration computing comprises: a) for a sequence $G^m$ where m is an ordinal number, let $G^0$ be the collection of open subsets of X; b) let $G^i=[G^{i-1}]_{\delta\sigma}$ when i is not a limit ordinal; c) let $G^i=U_{j<i}$ Gj when i is a limit ordinal; thereby d) the Borel σ-algebra $G^{\omega 1}$ can be generated from the class of open sets by iterating the operation where w is the first uncountable ordinal number. After getting the derived Borel σ-algebra, the first sub-system S1001 as a Borel-measure-derivation sub-system derives a corresponding Borel measure in a configured close-set interval according to the derived Borel σ-algebra.

Referring to FIG. 3 and also referring to FIG. 1A, in an embodiment, the above-mentioned second sub-system S1002 installed in WSTA02 coupled to the first sub-system S1001 performs operations of Lebesgue-dominated validation, wherein the operations of Lebesgue-dominated validation are implemented by the following modules stored in the system database located on NAS01: 1) a PDF derivation module M201 which makes use of the derived Borel measure collaborating an operation of normalization to obtain a probability density function (PDF) where the sum of the probability is 1 in a configured close-set interval; moreover, a means of deriving a PDF performed by the PDF derivation module M201 comprises the following subroutines: a) getting a probability measure from the derived Borel measure first; b) setting the probability measure as $\mu:B(X)\rightarrow[0, \infty)$ such that $\mu(\emptyset)=0$, and $B_1, B_2, \ldots \in B$ mutually disjoint, hence $$\mu\left(\bigcup_{i=1}^{\infty} B_i\right) = \sum_{i=1}^{\infty} \mu(B_i);$$

c) setting $\mu(X)=1$ so as to get a Borel probability measure for probability measurements in a configured close-set interval; and d) thereby the PDF derivation module M201 deriving a PDF via making use of the Borel probability measure μ and collaborating an operation of normalization; and 2) a Lebesgue's dominated convergence validator module M202 which performs a validation on the PDF derived from M201 wherein the validation is based on Lebesgue's dominated convergence theorem; once the result of the validation shows that the validated PDF fits Lebesgue's dominated convergence, the Lebesgue's dominated convergence validator module M202 will determine that the validated PDF is an applicable quantum hash function. Since a Borel measure is a continuous random variable itself and the sample points for deriving the Borel measure are collected from a quantum random number generator with true randomness, the PDF derived from a Borel probability measure will be a hash function with true-randomness as well.

Further, in some embodiments, the system S1000 repeatedly performs operations of Borel-measure derivation with S1001 and operations of Lebesgue-dominated validation with S1002 in sequence, and then discards duplicated quantum hash functions, thereby to get a plurality of applicable quantum hash functions.

Referring to FIG. 3 and also referring to FIG. 1A, in an embodiment, the above-mentioned third sub-system S1003 installed in a workstation WSTA03 performs operations of quantum-hash-value derivation, wherein the operations of quantum-hash-value derivation are implemented by the following modules stored in the system database located on NAS01: 1) a quantum-hash-table storage module M301 which derives candidate hash tables from the applicable quantum hash functions determined by the second sub-system S1002 and stores the candidate hash tables in a database located on the network attached storage NAS02 (D301 in FIG. 1A); 2) a Lebesgue-measure switching module M302 which collaborates webservers such as WS01 and WS02 installed on the workstations WSTA03 to get a user input value from the configured open-set interval of the Euclidean n-space $E^n$ and then performs an operation of isomorphism mapping to switch the user input value into a form of Lebesgue measure in the configured close-set interval; moreover, a means of deriving the Lebesgue measure performed by the Lebesgue-measure switching module M302 comprises the following subroutines: a) receiving user's data from a webserver and then treating the data as a set of points so as to get corresponding Euclidean norms from the set of points; b) via use of the Euclidean norms, switching the set of points into a Euclidean space to be the user input value, and c) getting the Lebesgue measure of the input value through an operation of isomorphism mapping from the Euclidean space; and 3) a quantum-hash-value generator module M303 which selects one or more candidate hash tables and leveraging the Lebesgue measure derived from the user input value as an index parameter of the selected quantum hash table so as to generate corresponding quantum hash values.

Further, in some embodiments, the third sub-system S1003 as a quantum-hash-value derivation sub-system makes the value generated from the former quantum hash function be the value of the later quantum hash function in sequence so as to generate a corresponding quantum hash value if more than one applicable quantum hash functions are selected for deriving a candidate hash table. Based on the above mechanism, S1003 will derive corresponding hash tables, and then these hash tables will be stored in a secured database located on NAS02 as well.

Thereby, the above embodiments of the present invention support to implement a system for generating quantum hash functions to enhance security on use of hash values. The present invention provides a dynamic mechanism to generate various true-randomness quantum hash functions instantly as well.

While the present disclosure has been described by means of specific embodiments, numerous modifications and variations could be made thereto by those skilled in the art without departing from the scope and spirit of the present disclosure set forth in the claims.

What is claimed is:

1. A system for generating quantum hash values through true-randomness quantum hash functions, the system comprising:
    a quantum random number generator;
    a first workstation comprising a first processing unit configured to perform instructions of a first sub-system, the first workstation deriving a Borel measure as an input factor which is a continuous random variable itself, the first sub-system including:
        1) A sample-points collection module coupled to the quantum random number generator, the quantum random number generator collecting a plurality of sample points within a configured open-set interval of a Euclidean n-space, wherein n is a configured integer which is larger than zero;
2) A Borel-set generator module, the Borel-set module generating available Borel sets based on a metric space composed of the collected plurality of sample points through all combinations of union operation of countable sets, intersection operation of countable sets, and complement operation of a set; and
3) A Borel-measure derivation module, the Borel-measure derivation module deriving a Borel σ-algebra based on the available Borel sets via means of transfinite induction and iteration computing and deriving a corresponding Borel measure based on the Borel σ-algebra which is derived from the available Borel sets generated by the Borel-set generator module, according to the derived Borel σ-algebra, deriving the Borel measure in a configured close-set interval, wherein the Borel measure corresponds to the derived Borel σ-algebra and making use of the derived Borel measure collaborating an operation of normalization to obtain a probability density function (PDF) where the sum of the probability of the obtained PDF is 1 in a configured close-set interval;
a second workstation comprising a second processing unit configured to perform instructions of a second sub-system, coupled to the first sub-system, the second workstation determining an applicable quantum hash function based on the Borel measure derived from the first sub-system by leveraging Lebesgue's dominated convergence theorem to perform a validation on the PDF and once the result of the validation showing that the validated PDF fits Lebesgue's dominated convergence, determining that the validated PDF is an applicable quantum hash function and discarding duplicated quantum hash functions; and
a third workstation comprising a third processing unit configured to perform instructions of a third sub-system, coupled to the second sub-system, the third workstation getting a user input value from the configured open-set interval of a Euclidean n-space and performing an operation of isomorphism mapping to switch the user input value into a form of Lebesgue measure in the configured close-set interval and then leveraging the Lebesgue measure switched from the user input value as an index parameter of the selected quantum hash table(s) for selecting one or more quantum hash tables;
wherein if more than one applicable quantum hash functions are selected for deriving a hash table, the value generated from the former quantum hash function is made to be the input parameter of the later quantum hash function in sequence; so as to generate a corresponding quantum hash value;
wherein the quantum hash value derived through hash tables derived from the quantum hash functions are determined by the second sub-system;
wherein the first workstation and the second workstation of the system are configured to generate various applicable quantum hash functions by performing the instructions of the first sub-system and the second sub-system in sequence repeatedly; and
wherein the third workstation is configured to perform the instructions of the third sub-system to provide a required quantum hash value through true-randomness quantum hash functions.

2. The system for quantum hash values through true-randomness quantum hash functions according to claim 1, wherein in order to facilitate deriving an applicable quantum hash function based on the Borel measure derived from the first sub-system, the second sub-system further comprises:
a) a probability density function (PDF) derivation module for deriving a probability density function via leveraging the derived Borel measure through an operation of normalization; and
b) a Lebesgue's dominated convergence validator module for determining whether the derived probability density function is an applicable quantum hash function via leveraging an operation of validation with Lebesgue's dominated convergence theorem.

3. The system for quantum hash values through true-randomness quantum hash functions according to claim 1, wherein in order to facilitate making the user input value be switched into the form of Lebesgue measure to generate a quantum hash value, the third sub-system further comprises:
a) a quantum-hash-table storage module which stores candidate quantum hash tables derived from the applicable quantum hash functions determined by the second sub-system;
b) a Lebesgue-measure switching module which receives the user input value and switches the user input value into the form of Lebesgue measure through an operation of isomorphism mapping; and
c) a quantum-hash-value generator module which selects one of the candidate quantum hash tables stored by the quantum-hash-table storage module and uses the Lebesgue measure switched from the Lebesgue-measure switching module as an index parameter of the selected quantum hash table so as to generate a corresponding quantum hash value.

4. A method for generating quantum hash values through true-randomness quantum hash functions, the method comprising the following processes:
a) coupling a quantum random number generator to collect a plurality of sample points within a configured open-set interval of a Euclidean n-space, wherein n is a configured integer which is larger than zero;
b) generating available Borel sets based on a metric space composed of the plurality of collected sample points via means of union operation of countable sets, intersection operation of countable sets, and complement operation of a set;
c) deriving a Borel σ-algebra based on the available Borel sets via means of transfinite induction and iteration computing;
d) according to the derived Borel σ-algebra, deriving a Borel measure in a configured close-set interval, wherein the Borel measure corresponds to the derived Borel σ-algebra;
e) making use of the derived Borel measure collaborating an operation of normalization to obtain a probability density function (PDF) where the sum of the probability of the obtained PDF is 1 in a configured close-set interval;
f) leveraging Lebesgue's dominated convergence theorem to perform a validation on the PDF;
g) once the result of the validation showing that the validated PDF fits Lebesgue's dominated convergence, determining that the validated PDF is an applicable quantum hash function;

h) repeatedly performing processes a) to g) in sequence and discarding duplicated quantum hash functions, so as to get a plurality of applicable quantum hash functions;
i) deriving candidate hash tables through the applicable quantum hash functions;
j) getting a user input value from the configured open-set interval of a Euclidean n-space and performing an operation of isomorphism mapping to switch the user input value into a form of Lebesgue measure in the configured close-set interval; and
k) selecting one or more candidate quantum hash tables and leveraging the Lebesgue measure switched from the user input value as an index parameter of the selected quantum hash table(s); wherein, if there are more than one applicable quantum hash functions are selected for deriving a hash table, the value generated from the former quantum hash function is made to be the input parameter of the later quantum hash function in sequence; so as to generate a corresponding quantum hash value.

* * * * *